United States Patent [19]

Kushnick

[11] Patent Number: 4,529,457

[45] **Date of Patent: * Jul. 16, 1985**

[54] AMORPHOUS PRESS FORMED SECTIONS

[75] Inventor: Julian H. Kushnick, Brooklyn, N.Y.

[73] Assignee: Allied Corporation, Morris Township, Morris County, N.J.

[ * ] Notice: The portion of the term of this patent subsequent to Jul. 16, 2002 has been disclaimed.

[21] Appl. No.: 399,397

[22] Filed: Jul. 19, 1982

[51] Int. Cl.[3] .......................... H01F 1/12; B23K 20/02

[52] U.S. Cl. .................................. 148/403; 148/31.55; 148/121; 228/190; 228/234; 228/265; 336/212

[58] Field of Search ............... 228/265, 190, 234, 238; 428/605; 336/212, 213; 148/120, 121, 31.55, 108, 403

[56] References Cited

U.S. PATENT DOCUMENTS

| | | | |
|---|---|---|---|
| 3,748,721 | 7/1973 | Alexandria | 228/190 X |
| 4,053,333 | 10/1977 | Egami et al. | 148/120 |
| 4,056,411 | 11/1977 | Chen et al. | 148/121 |
| 4,142,571 | 3/1979 | Narasimhan | 164/88 |
| 4,197,116 | 4/1980 | Frischmann | 148/108 X |
| 4,201,837 | 5/1980 | Lupinski | 428/457 |
| 4,202,196 | 5/1980 | Asai et al. | 29/605 X |
| 4,298,382 | 11/1981 | Stempin et al. | 75/202 |
| 4,298,409 | 11/1981 | DeCristofaro et al. | 148/108 |
| 4,364,020 | 12/1982 | Lin et al. | 336/212 |
| 4,368,447 | 1/1983 | Inomata et al. | 336/20 |
| 4,377,622 | 3/1983 | Liebermann | 428/605 |
| 4,381,197 | 4/1983 | Liebermann | 419/24 |

FOREIGN PATENT DOCUMENTS

| | | |
|---|---|---|
| 20937 | 1/1981 | European Pat. Off. . |

OTHER PUBLICATIONS

H. H. Liebermann, "Warm-Consolidation of Glassy Alloy Ribbons," Conference on Rapid Solidification Processing, General Electric Co., Schenectady (N.Y.). Final Report under Contract DE-4C01-78E r 9313, "Development of a Low Loss Magnetic Composite Utilizing Amorphous Metal Flake".

J. P. Patterson et al., "Moulding of a Metallic Glass," *Mat. Res. Bull.*, vol. 13, pp. 583-585, (1978).

*Primary Examiner*—Kenneth J. Ramsey

*Attorney, Agent, or Firm*—James Riesenfeld; Gerhard H. Fuchs

[57] ABSTRACT

This invention relates to the production of large non-planar shapes of metallic glass fabricated from ribbon. The inventive method contemplates stacking the ribbon. The stacked ribbon is formed and held at temperatures of between 70 and 90% of the crystallization temperature for a time sufficient to facilitate permanent deformation of the stacked ribbons and to bond the ribbons.

6 Claims, 1 Drawing Figure

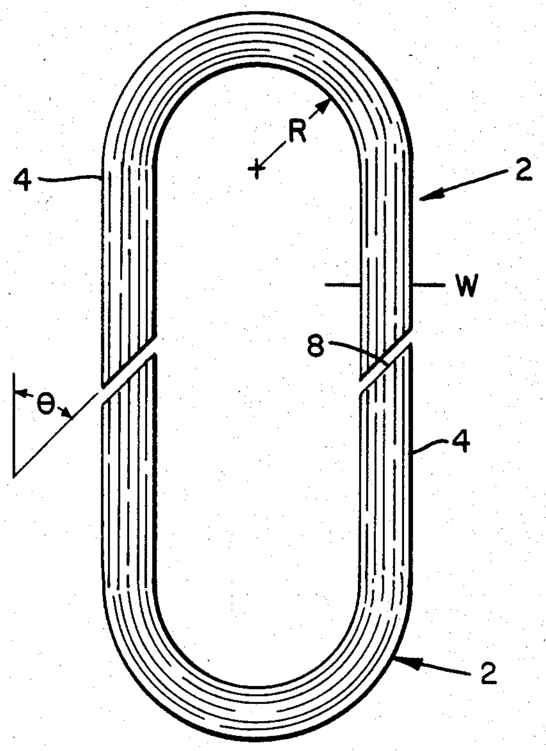
4
R
2
W
8
θ
4
2

AMORPHOUS PRESS FORMED SECTIONS

DESCRIPTION

1. Field of Invention

The present invention relates to a method of press forming amorphous ribbon.

2. Background of the Invention

Ferromagnetic metallic glasses have received much attention because of their exceptional magnetic properties. However, the shapes that can be produced have been limited to thin ribbons. Mechanical stacking of these thin ribbons results in a substantial reduction in the magnetic properties since the stacking efficiency of the ribbons is low, and the apparent density of the stacked ribbons is substantially less than the theoretical density.

This limitation with regard to the thickness of amorphous magnetic materials has in part been overcome by U.S. Pat. No. 4,298,382 ('382) which teaches and claims placing finely dimensioned bodies in touching relationship with each other, and then hot pressing in a non-oxidizing environment at temperatures ranging from about 25° C. below the glass transition temperature to about 15° C. above the glass transition temperature under an applied force of at least 1000 psi (6895 kPa) for a period of time sufficient to cause the bodies to flow and fuse together into an integral unit with a substantial increase in density of the resulting product.

H. H. Liebermann in an article entitled "Warm-Consolidation of Glassy Alloy Ribbon" points out that significant amounts of shear must occur between adjacent ribbons for successful consolidation of amorphous materials.

While the '382 patent and the Liebermann article establish a method for consolidation of amorphous material units by promoting material flow, for many magnetic applications it is preferred to bond consolidated amorphous ribbon to or near the theoretical density while limiting flow, since mechanical flow causes loss of identity of the individual ribbon.

SUMMARY OF INVENTION

An object of this invention is to provide a method for press forming metallic glass ribbon to produce non-planar bulk shapes while maintaining the identity of the individual ribbons.

This method for press forming metallic glass ribbon in its broadest terms can be summarized by the following steps: metallic glass ribbons are stacked in an overlapping relationship; then the stacked ribbons are press formed to a non-planar configuration; and the press formed ribbons are held at temperatures between about 70 and 90% of the absolute crystallization temperature ($T_x$) for a time sufficient to permanently set the stacked press formed ribbons and to bond the individual ribbons.

For amorphous solids the crystallization temperature ($T_x$) is generally defined as the temperature at which the onset of crystallization occurs.

$T_x$ can be determined using a differential scanning calorimeter as the point at which there is a change in sign of the slope of the heat capacity versus temperature curve.

Press forming of the bulk objects can be done in an oxidizing atmosphere, such as air, while still maintaining the identity of the individual ribbons. It has been found that some dependent variation in time, pressure and/or temperature can be made. For example, if a lower temperature is employed then either longer time and/or higher pressure will be required to achieve bonding. In general it is preferred that a pressure of at least 1000 psi (6895 kPa) be applied to the bulk object during press forming.

BRIEF DESCRIPTION OF THE DRAWING

The FIGURE is a schematic representation of a magnetic split C core.

BEST MODE FOR CARRYING THE INVENTION INTO PRACTICE

Ribbon of metallic glass can be cast by techniques such as jet casting which is described in the '382 patent. In general these ribbons will have a thickness of less than about 4 mils (101 microns), widths up to approximately 0.25 inches (0.635 cm), and can be produced in any desired length. When wider ribbons are desired a planar flow caster such as described in U.S. Pat. No. 4,142,571 may be employed.

It has been found that no special preparation of the ribbon surface need be made prior to compaction, and that ribbons with as cast surfaces can be compacted in accordance with the method of the present invention to form bulk objects. The stacked ribbons can be deformed by the shear associated with press forming without loss of identity of the individual ribbons.

Ribbons of metallic glass have been successfully press formed while maintaining the identity of the individual ribbons at temperatures between about 70% and 90% of the absolute crystallization temperature $T_x$. The lower temperature limit provides for bonding of the individual ribbons in a reasonable time, while the upper temperature limits assures that the material will not crystallize during press forming. It is preferred that the temperature for bonding be between about 80% and 90% of the $T_x$.

Prior to press forming, ribbons segments are cut to the desired lengths and stacked.

In order to avoid shifting of the stacked ribbons it is preferred that open dies are used and that the stacked ribbons be bundled and bound at periodic intervals with tape. A fiberglass tape, such as Scotch Brand #27 cloth electrical tape, has been found effective in minimizing relative translation between ribbons during hot pressing.

It is further preferred that the bundled ribbons be wrapped in a metal foil, such as stainless steel, to minimize the potential for the stacked ribbons to stick to the hot pressing die. When multiple bulk objects are to be produced in the same die, foil can be used to separate the objects and prevent them from sticking to each other, as well as to prevent them from sticking to the die.

When ferromagnetic properties are desired, any ferromagnetic amorphous material can be compacted by the technique described above. Compositions of typical ferromagnetic metallic glass materials that can be compacted using the method of the present invention are found in U.S. Pat. No. 4,298,409.

When it is desired to produce C cores for magnetic applications as illustrated in the FIGURE, it is preferred that the stacked ribbons terminate in an acute angle $\theta$ with respect to leg 4 of the C core section 2. This C core section can be readily fabricated from ribbons which are stacked to provide a shear translation in the direction tangent to the radius of curvature R of the formed C core sections. The junction 8 between C core sections 2 in order to be planar should have the curvature R large when compared to the width W of the C core sections 2. It is preferred to have $\theta$ P be between 10° and 30° so as to assure that junction 8 between C core sections 2 is such that there is a minimum effect of the curvature R on the junction 8.

In order to illustrate the invention the following examples are offered.

EXAMPLES 1–5

Five press formed sections were prepared. To form the sections ferromagnetic ribbons having the nominal composition $Fe_{78}B_{13}Si_9$ (subscripts in atomic percent) were used. This alloy has a Curie temperature of 415° C., and a crystallization temperature ($T_x$) of 550° C. The ribbons had a thickness of 1 to 2 mils (25 to 50 microns) and a width of 2 inches (5 cm). Bundles were formed using 85 pieces of ribbon. The bundles of ribbon were bound with Scotch #27 fiberglas electrical tape, and then wrapped in 2 mil (50 micron) stainless steel foil. The bundled ribbons were stacked and then placed in contact with a circular groove that was 1.5 inches (3.8 cm) in diameter. The ribbons were hot pressed at a temperature of 390° C. using a circular die that was 1.405 inches (3.57 cm) in diameter. During hot pressing a pressure of 12,500 psi (86,188 kPa) was applied for 30 minutes. The resulting press formed sections all had a density of 90% theoretical and no crystallization was detected in any of the press formed sections using X-ray diffraction. The bond strength of the ribbons was measured and found to be 40 psi (276 kPa).

EXAMPLES 6–11

Table 1 lists illustrative combinations of pressures, temperatures and times falling within the scope of the invention for press forming metallic glass ribbon.

TABLE 1

| TIME | TEMPERATURE | PRESSURE ksi | PRESSURE KPa | BOND |
|---|---|---|---|---|
| 15 min | 390° | 25 | 172,375 | good |
| 30 min | 350° | 25 | 172,375 | good |
| 30 min | 400° | 12.5 | 86,188 | good |
| 60 min | 390° | 8 | 55,160 | good |
| 30 min | 410° | 10 | 68,950 | good |
| 120 min | 390° | 6 | 41,370 | good |

In order to improve the magnetic properties of the consolidated strip it is preferred to give the consolidated strip a post consolidation anneal. The annealing temperature should be above the pressing temperature, preferably above the Curie temperature, and below the crystallization temperature.

What we claim is:

1. A method for making bulk samples from metallic glass ribbons comprising:

stacking aligned ribbons in an overlapping parallel relationship;

forming said stacked ribbons to a non-planar configuration; and holding said formed stacked ribbons at a pressure of at least 1000 psi (6895 kPa) at a temperature between about 70 and 90% of the crystallization temperature for a time sufficient to provide permanent deformation of said stacked deformed ribbons and to bond the ribbons together.

2. The method of claim 1 wherein the temperature is further restricted to 80 to 90% of the crystallization temperature and said formed stacked ribbons are held at temperature and pressure in an oxidizing atmosphere.

3. The method of claim 1 or 2 where said stacked strips are bundled.

4. The method of claim 3 wherein said stacked strips are wrapped in foil before forming.

5. The method of claim 4 wherein the consolidated ribbon is given an anneal at between about the pressing temperature and 100° C. above the pressing temperature.

6. The consolidated product made by the process of claim 1.

* * * * *